(12) United States Patent
Zhang

(10) Patent No.: US 10,484,342 B2
(45) Date of Patent: Nov. 19, 2019

(54) ACCURACY AND SECURITY OF DATA TRANSFER TO AN ONLINE USER ACCOUNT

(71) Applicant: Alibaba Group Holding Limited, George Town (KY)

(72) Inventor: Di Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 155 days.

(21) Appl. No.: 15/720,434

(22) Filed: Sep. 29, 2017

(65) Prior Publication Data

US 2018/0026951 A1    Jan. 25, 2018

Related U.S. Application Data

(63) Continuation of application No. PCT/CN2016/077299, filed on Mar. 25, 2016.

(30) Foreign Application Priority Data

Apr. 14, 2015    (CN) .......................... 2015 1 0175942

(51) Int. Cl.
*H04L 29/06*        (2006.01)
*G06Q 40/02*        (2012.01)
(Continued)

(52) U.S. Cl.
CPC .......... *H04L 63/0428* (2013.01); *G06F 16/00* (2019.01); *G06Q 40/02* (2013.01); *H04L 9/0847* (2013.01); *H04L 63/06* (2013.01)

(58) Field of Classification Search
None
See application file for complete search history.

(56) References Cited

U.S. PATENT DOCUMENTS 6,829,607 B1    12/2004    Tafoya et al.
7,725,421 B1    5/2010    Gedalius et al.
(Continued)

FOREIGN PATENT DOCUMENTS

CN    101116357    1/2008
CN    101184058    5/2008
(Continued)

OTHER PUBLICATIONS

Wang, G. Alan et al. The Arizona IDMatcher: A Probabilistic Identity Matching System. 2007 IEEE Intelligence and Security Informatics. https://ieeexplore.ieee.org/stamp/stamp.jsp?tp=&arnumber=4258703 (Year: 2007).*

(Continued)

*Primary Examiner* — Jeremiah L Avery
(74) *Attorney, Agent, or Firm* — Fish & Richardson P.C.

(57) ABSTRACT

Account information, input by a user for data transfer, is received. Identity information associated with the received account information is determined. One or more pieces of account information associated with the determined identity information are determined. The one or more pieces of account information are determined based on a predetermined condition. The one or more pieces of account information include the received account information. The one or more pieces of account information are provided to the user. In response to receiving a user confirmation of the one or more pieces of account information, the data transfer is performed based on the user confirmation.

17 Claims, 3 Drawing Sheets

(51) Int. Cl.
*H04L 9/08* (2006.01)
*G06F 16/00* (2019.01)

(56) References Cited

U.S. PATENT DOCUMENTS

| | | | | |
|---|---|---|---|---|
| 9,123,186 | B2* | 9/2015 | Ricci | H04W 4/21 |
| 9,210,183 | B2* | 12/2015 | Sadovsky | G06F 3/0481 |
| 9,760,871 | B1* | 9/2017 | Pourfallah | G06Q 50/22 |
| 2003/0172030 | A1 | 9/2003 | Volgunin | |
| 2007/0276925 | A1* | 11/2007 | La Joie | G06Q 30/0256 |
| | | | | 709/219 |
| 2008/0140576 | A1 | 6/2008 | Lewis et al. | |
| 2008/0177994 | A1* | 7/2008 | Mayer | G06F 9/4418 |
| | | | | 713/2 |
| 2012/0253852 | A1* | 10/2012 | Pourfallah | G06Q 20/3276 |
| | | | | 705/4 |
| 2012/0316992 | A1* | 12/2012 | Oborne | G06Q 30/06 |
| | | | | 705/26.41 |
| 2013/0036027 | A1* | 2/2013 | Walker | G06Q 20/04 |
| | | | | 705/26.41 |
| 2013/0054451 | A1* | 2/2013 | Maley | G06Q 40/02 |
| | | | | 705/40 |
| 2013/0211985 | A1 | 8/2013 | Clark et al. | |
| 2015/0026027 | A1* | 1/2015 | Priess | G06Q 40/00 |
| | | | | 705/35 |

FOREIGN PATENT DOCUMENTS

| | | |
|---|---|---|
| CN | 101291302 | 10/2008 |
| CN | 101453431 | 6/2009 |
| CN | 101501612 | 8/2009 |
| CN | 101616102 | 12/2009 |
| CN | 101751627 | 6/2010 |
| CN | 102160077 | 8/2011 |
| CN | 102457501 | 5/2012 |
| CN | 102768659 | 11/2012 |
| CN | 103297267 | 9/2013 |
| CN | 103514668 | 1/2014 |
| CN | 104052720 | 9/2014 |
| JP | 2004-072248 | 3/2004 |
| KR | 20080025773 | 3/2008 |
| WO | 2013116848 | 8/2013 |

OTHER PUBLICATIONS

Cunha, Felipe D. et al. ID-MAC: An Identity-Based MAC Protocol for Wireless Sensor Networks. 2013 IEEE Symposium on Computers and Communications (ISCC). https://ieeexplore.ieee.org/stamp/stamp.jsp?tp=&arnumber=6755076 (Year: 2013).*

Zaghloul, Said; Jukan, Admela. Optimal Accounting Policies for AAA Systems in Mobile Telecommunications Networks. IEEE Transactions on Mobile Computing, vol. 9, Issue: 6. https://ieeexplore.ieee.org/stamp/stamp.jsp?tp=&arnumber=5383362 (Year: 2010).*

Search Report and Written Opinion of the Intellectual Property Office of Singapore issued in SG Appiication No. 11201708159U dated Aug. 20, 2018; 11 pages.

Extended European Search Report in European Application No. 16779515.2, dated Sep. 21, 2018, 7 pages.

International Search Report of the International Searching Authority issued in International Application No. PCT/CN2016/077299 dated Jun. 15, 2016; 8 pages.

* cited by examiner

ACCURACY AND SECURITY OF DATA TRANSFER TO AN ONLINE USER ACCOUNT

CROSS REFERENCE TO RELATED APPLICATIONS

This application is a continuation of PCT Application No. PCT/CN2016/077299, filed on Mar. 25, 2016, which claims priority to Chinese Application No. 201510175942.8, filed on Apr. 14, 2015, the entire contents of each are hereby incorporated by reference.

BACKGROUND

To transfer data to a user account online, a user needs to input account information associated with the user account. When erroneous account information is input by the user, for example due to similarity between two different user accounts, data can be transferred to an erroneous user account.

SUMMARY

The present disclosure describes improving accuracy and security of data transfer to an online user account.

In an implementation, account information, input by a user for data transfer, is received. Identity information associated with the received account information is determined. One or more pieces of account information associated with the determined identity information are determined. The one or more pieces of account information are determined based on a predetermined condition. The one or more pieces of account information include the received account information. The one or more pieces of account information are provided to the user. In response to receiving a user confirmation of the one or more pieces of account information, the data transfer is performed based on the user confirmation.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach can be used to enable more accurate and secure online data transfers. For example, when account information input by a user corresponds to a particular piece of identity information, such as a name, and the same identity information is associated with multiple pieces of similar account information, the multiple pieces of account information can be provided to the user for verification before transferring the data to an online account. Obtaining the user confirmation of the multiple pieces of account information prior to the data transfer can ensure that the data is transferred to the correct online account. Second, the described approach can mitigate or avoid data loss due to human error associated with input of account information. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
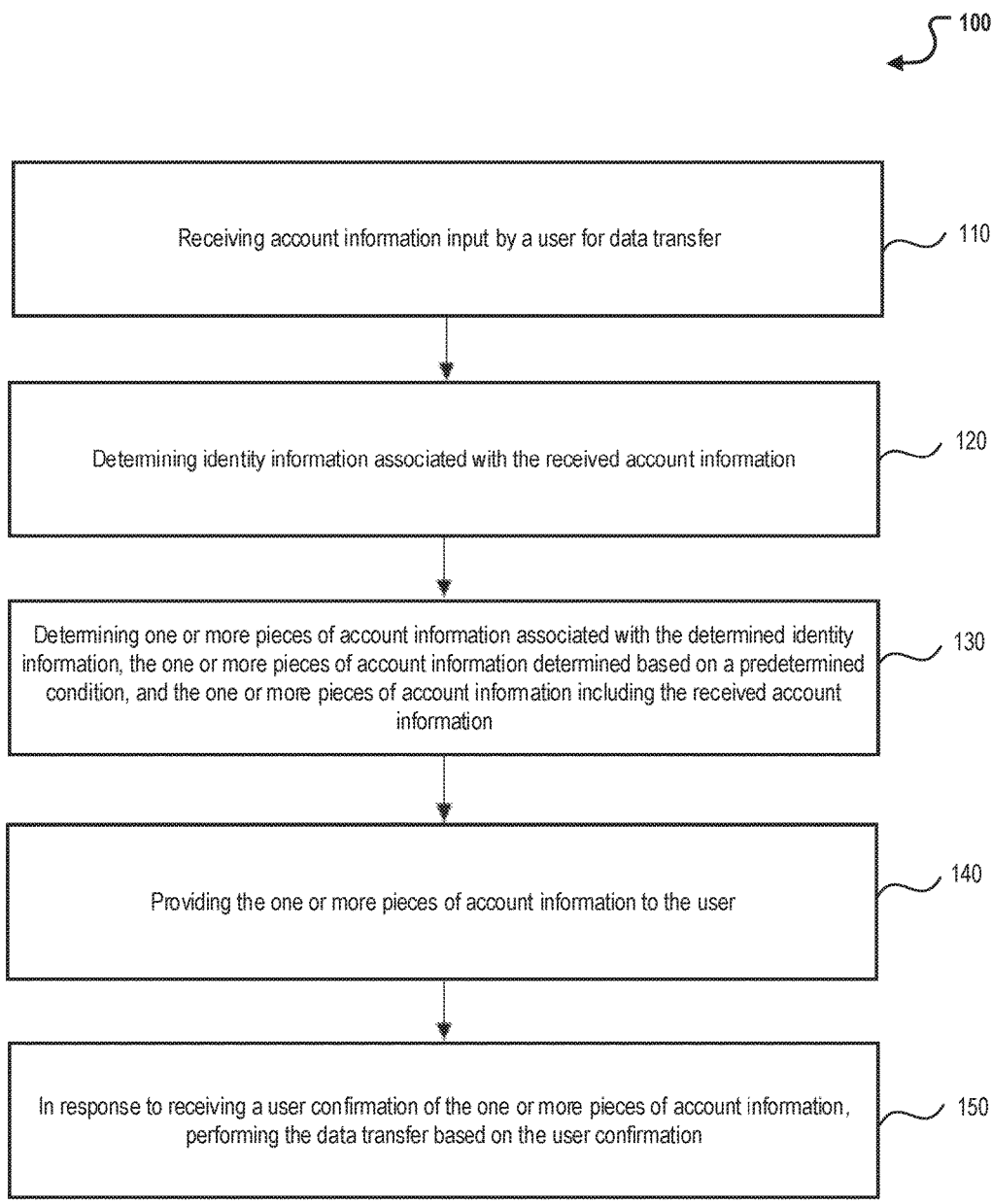
FIG. 1 is a flowchart illustrating an example of a method for data transfer to an online user account, according to an implementation of the present disclosure.

The following detailed description describes transferring data to an online user account and, particularly, improving the accuracy and security of the data transfer to the online user account. The detailed description is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

When applying for an online user account, a user can use, for example, an email address or a cell phone number, for registration or verification portions of the application. The email address or the cell phone number used for the application can also be used, for example, for account login and data transfer purposes. In some instances, users with similar names can have similar email addresses. For example, users with the same name "Zhang San" can have e-mail addresses of "zhangsan01@xxx.com" and "zhangsan001@xxx.com," which are very similar. When a particular user intends to transfer data to the online user account of user Zhang San associated with the email address "zhangsan01@xxx.com," but erroneously inputs "zhangsan001@xxx.com," it is clear that merely verifying basic identity information (for example, the name "Zhang San") associated with the desired online user account cannot ensure identification of the input error or prevent data from being transferred to the erroneous account.

At a high-level, the described approach provides a mechanism to automatically determine identity information associated with online user account information input by a user, determine one or more pieces of online user account information associated with the identity information, and provide the one or more pieces of online user account information to the user for confirmation before transferring data. Based on the user confirmation, data can be transferred to an intended online user account even when the user made a graphical error entering the recipient online user account information. For example, if a user intends to transfer data to Zhang San associated with the email address "zhangsan01@xxx.com," but erroneously inputs recipient email address "zhangsan001@xxx.com," both "zhangsan01@xxx.com" and "zhangsan001@xxx.com" can be provided to the user for user confirmation of the actual intended recipient online user account.

FIG. 1 is a flowchart illustrating an example of a method 100 for data transfer to an online user account, according to an implementation of the present disclosure. For clarity of presentation, the description that follows generally describes method 100 in the context of the other figures in this description. However, it will be understood that method 100 can be performed, for example, by any suitable system, environment, software, and hardware, or a combination of systems, environments, software, and hardware, as appropriate. In some implementations, various steps of method 100 can be run in parallel, in combination, in loops, or in any order. In some implementations, the method 100 can include additional or different (or a combination of both) steps not shown in the flowchart. In some implementations, various steps of method 100 can also be omitted from the method 100.

At 110, account information input by a user for data transfer is received. In some implementations, the data transfer can be performed on a third-party interaction platform, such as that provided by a bank or a payment company. In general, when a user applies for an account on a third-party interaction platform, the user can use, for example, an email address or a cell phone number, for registration or verification portions of the application. The email address or the cell phone number that the user used can be used, for example, for account login and data transfer purposes. For example, a user can log into a bank account, and transfer money to a user Zhang San, associated with an email address "zhangsan01@xxx.com," through input of account information (for example, email address "zhangsan01@xxx.com") associated with user Zhang San's bank account. From 110, method 100 proceeds to 120.

At 120, identity information associated with the received account information is determined. In some implementations, the identity information can include the name of a user. In some implementations, identity information associated with the received account information can be determined by accessing an account information database. In some implementations, an account username, such as member name or member ID, is determined first, and then identity information associated with the received account information is determined based on the determined account username. For example, if a user inputs "zhangsan01@xxx.com" as recipient account information, an account username associated with "zhangsan01@xxx.com" is first determined to be "ZhangSan01," and then identity information associated with "zhangsan01@xxx.com" is determined to be "Zhang San" based on the account username "ZhangSan01." From 120, method 100 proceeds to 130.

At 130, one or more pieces of account information associated with the determined identity information are determined. In some implementations, the one or more pieces of account information are determined based on a predetermined condition. For example, the predetermined condition can include a degree of similarity with the received account information greater than a predetermined threshold. The threshold can be determined statically, dynamically, or with a combination of both. In some implementations, the threshold can be set statically to provide, for example, five pieces of account information to the user. In some implementations, the threshold can be set dynamically based on, for example, the number of letters in the name of the user, the total number of account information associated with the name of the user, or a combination of both. A degree of similarity between a particular piece of account information and the received account information can be calculated by a predetermined similarity algorithm. In some implementations, a degree of similarity between two pieces of account information can be calculated based on a ratio of the number of same consecutive letters in the two pieces of account information to the number of different letters in the two pieces of account information. For example, a degree of similarity between "Zhangsan" and "Zhangsan001" is 8/3x. The number of same consecutive letters in "Zhangsan" and "Zhangsan001" is 8, the number of different letters in "Zhangsan" and "Zhangsan001" is 3, and x is a coefficient (for example, x=1). In some implementations, a degree of similarity between two pieces of account information can be calculated based on a ratio of the number of different letters in the two pieces of account information to the number of same consecutive letters in the two pieces of account information.

Based on calculated degrees of similarity, the one or more pieces of account information can be determined. Each piece of account information in the one or more pieces of account information has a degree of similarity with the received account information greater than the predetermined threshold. In some implementations, the one or more pieces of account information include the received account information, having a degree of similarity of 100%. For example, if a predetermined threshold is set to 80% and the determined identity information is the name "Zhang San," degrees of similarity can be calculated for part or all pieces of account information associated with the name "Zhang San." The following four pieces of account information are associated with the name "Zhang San," and have respective degrees of similarity with the received account information (that is, "zhangsan01@xxx.com") greater than 80%: "zhangsan01@xxx.com," "zhangsan001@xxx.com," "zhang.san01@xxx.com," and "zhangsan.01@xxx.com." The four pieces of account information are then determined to be the one or more pieces of account information associated with the determined identity information (that is, name "Zhang San"). In some implementations, the predetermined threshold can be adjusted to balance user experience and to prevent data from being transferred to an erroneous user account. For example, increasing the predetermined threshold can reduce the probability of providing the user with more than one pieces of account information for confirmation, and hence improve user experience on data transfer. Decreasing the predetermined threshold can increase the probability of providing the user with more than one pieces of account information for confirmation, and hence reduce the probability of transferring data to an erroneous user account.

In some implementations, a relationship list can be queried for one or more pieces of account information associated with the determined identity information that satisfy the predetermined condition. The relationship list can store multiple pieces of identity information. For example, when a user registers an online user account, the name of the user, the user account information, and the relationship between the name of the user and the user account information are stored in the relationship list. In addition, identity information and address information of the user can be stored in the relationship list. The relationship list can be a table or other data structure that can store the name of the user, the user account information, and the relationship between the name of the user and the user account information. In some implementations, the relationship list can be queried using a Structured Query Language (SQL) query. Additionally, for each piece of identity information, the relationship list can store one or more pieces of account information that satisfy the predetermined condition. In doing so, queries of the relationship list for the one or more pieces of account information associated with the determined identity information can be accelerated.

In some implementations, the relationship list can be updated based on user feedback. For example, a user can report an erroneous piece of account information input by the user when the user intends to input a particular piece of account information. The user can call customer service to report that he/she transferred data to an erroneous account. The customer service can record the erroneous data transfer case and the reason for the erroneous data transfer (for example, due to similarity between the erroneous piece of account information and the particular piece of account information). Both the erroneous piece of account information and the particular piece of account information are associated with the same piece of identity information. The relationship list can be updated to include the erroneous piece of account information associated with the same piece of identity information. In some implementations, the relationship list can be stored locally in a data processing device performing the data transfer or remotely to the data processing device.

In some implementations, if no account information associated with the determined identity information and that satisfies the predetermined condition can be located in the relationship list, an account information database can be queried. The account information database can store multiple pieces of identity information, multiple pieces of account information, and relationships between the multiple pieces of identity information and the multiple pieces of account information. In some implementations, the account information database stores all identity information and all account information. Once account information associated with the determined identity information is located in the account information database, one or more pieces of account information associated with the determined identity information that satisfy the predetermined condition can be determined from the located account information. In some implementations, the determined one or more pieces of account information associated with the determined identity information that satisfy the predetermined condition can be stored in the relationship list. In some implementations, the account information database can be stored locally in a data processing device performing the data transfer or remotely to the data processing device. In some implementations, both the relationship list and the account information database can be queried for one or more pieces of account information associated with the determined identity information that satisfy the predetermined condition. From 130, method 100 proceeds to 140.

At 140, the one or more pieces of account information are provided to the user. For example, if the following four pieces of account information, associated with the name "Zhang San," are determined to satisfy the predetermined condition, namely, "zhangsan01@xxx.com," "zhangsan001@xxx.com," "zhang.san01@xxx.com," and "zhangsan.01@xxx.com," the four pieces of account information are provided to the user (such as displaying the four pieces of account information on a computer display) before the data transfer. In some implementations, both the one or more pieces of account information and corresponding degree of similarity with the received account information can also be provided to the user. In some implementations, if more than one piece of account information is provided to the user, the account information can be provided in a predetermined order (such as an ascending order or a descending order) according to a corresponding degree of similarity with the received account information. The user can use the provided information to confirm, correct, or to report recipient account of the data transfer (for example, through actions performed on a graphical user interface or a mobile or other computing device). From 140, method 100 proceeds to 150.

At 150, in response to receiving a user confirmation of the one or more pieces of account information, the data transfer is performed. In some implementations, when the one or more pieces of account information include more than one piece of account information, the user can confirm the one or more pieces of account information by selecting a single piece of account information. In other implementations, the user may be required to select more than one piece of account information or input some additional type of confirmation (for example, select a graphical user interface element, or input some text).

As a result of the user confirmation, the data is transferred to an account with account information selected by the user. In some implementations, when the one or more pieces of account information include only one piece of account information, the user confirmation confirms that the user-input account information is correct, and the data is transferred to the user-indicated account. In some implementations, after the user confirmation is received, the user-confirmed recipient account information is stored in the relationship list associated with the determined identity information.

In some implementations, after the data transfer is completed, user feedback for the data transfer can be requested/received. For example, the user can receive a prompt indicating that the recipient account information is error prone and asking the user to double check the correctness of the recipient account information. In response to receiving the user feedback, the user-confirmed recipient account information associated with the data transfer can be stored in the relationship list associated with the determined identity information. After 150, method 100 stops.

Figure 2:
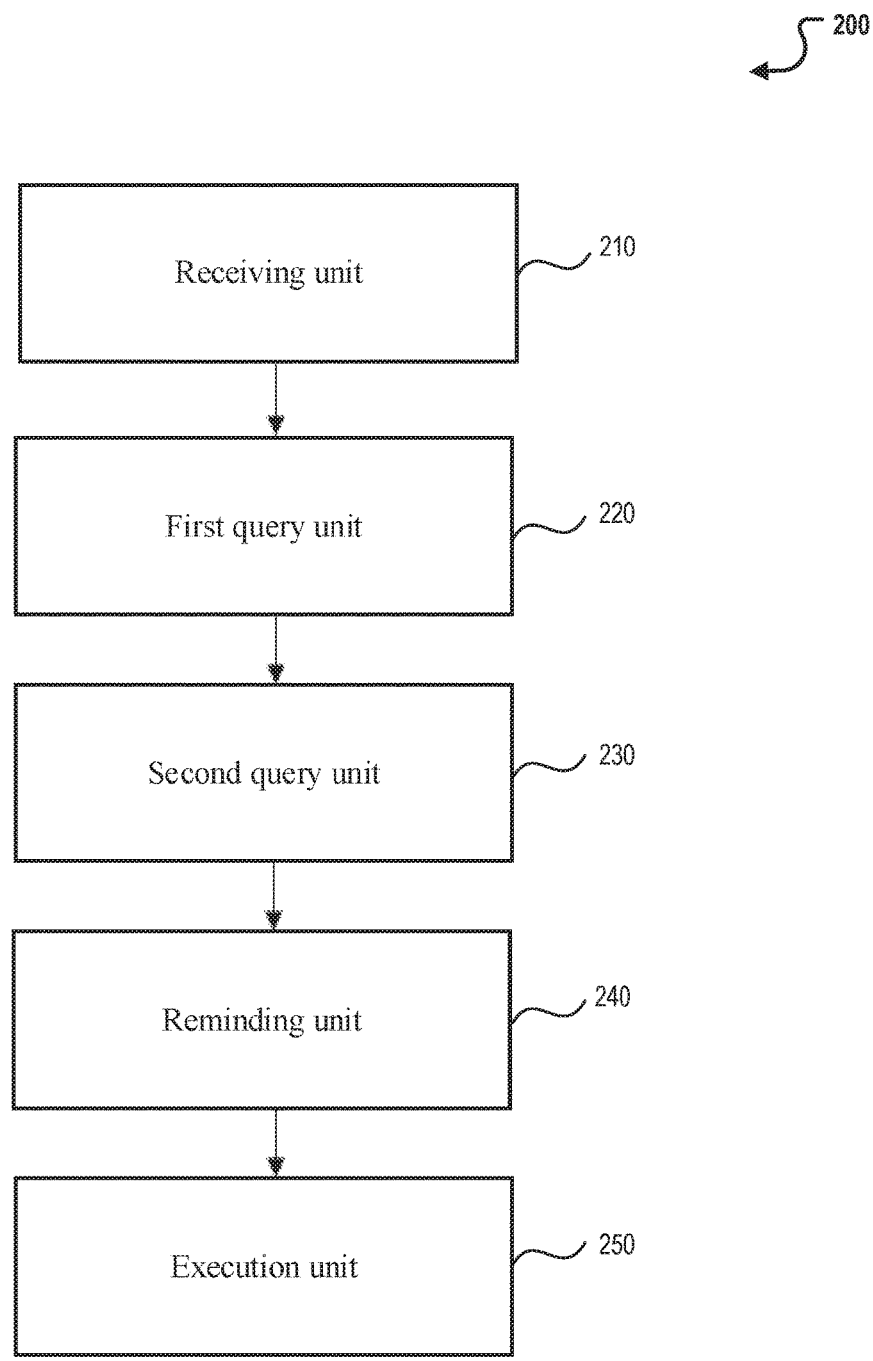
FIG. 2 is a block diagram illustrating an example of a data processing device for data transfer to an online user account, according to an implementation of the present disclosure.

FIG. 2 is a block diagram illustrating an example of a data processing device 200 for data transfer to an online user account, according to an implementation of the present disclosure. For clarity of presentation, the description that follows generally describes device 200 in the context of the other figures in this description. The device 200 can include a receiving unit 210, a first query unit 220, a second query unit 230, a reminding unit 240, and an execution unit 250, which can be implemented in hardware, software, or both. In some implementations, the device 200 can include additional or different (or a combination of both) components not shown in the block diagram, such as a first storage unit, a second storage unit, or a combination of both. In some implementations, components can also be omitted from the device 200.

The receiving unit 210 can receive account information input by a user for data transfer, as discussed in step 110 of FIG. 1. The first query unit 220 can query identity information associated with the received account information, as discussed in step 120 of FIG. 1. The second query unit 230 can query one or more pieces of account information associated with the identity information, as discussed in step 130 of FIG. 1. In some implementations, the second query unit 230 can include a first query sub-unit and a second query sub-unit. The first query sub-unit can directly query a relationship list for one or more pieces of account information associated with the identity information. The second query sub-unit can directly query an account information database for one or more pieces of account information associated with the identity information. The reminding unit 240 can provide at least the one or more pieces of account information to the user, as discussed in step 140 of FIG. 1. The execution unit 250 can perform the data transfer based on a user confirmation of the one or more pieces of account information, as discussed in step 150 of FIG. 1. In some implementations, the device 200 can include a first storage unit. The first storage unit can store the identity information, the one or more pieces of account information associated with the identity information, and relationships between the identity information and the one or more pieces of account information in the relationship list, after the first query sub-unit queries the relationship list for the one or more pieces of account information associated with the identity information. In some implementations, the device 200 can include a second storage unit. The second storage unit can store the identity information, the one or more pieces of account information associated with the identity information, and relationships between the identity information and the one or more pieces of account information in the relationship list, after the receiving unit 210 receives a user feedback for the data transfer.

Figure 3:
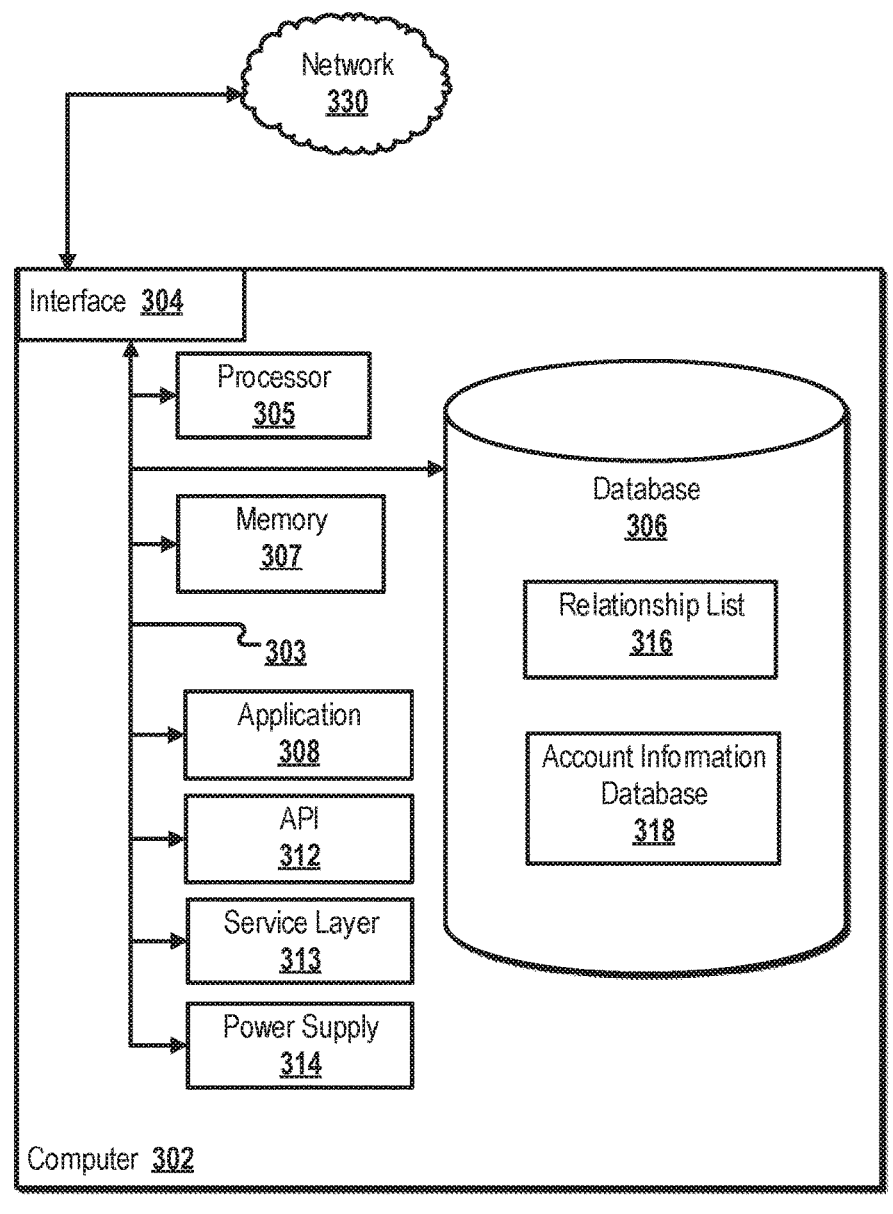
FIG. 3 is a block diagram illustrating an example of a computer system used to provide computational functionalities associated with described algorithms, methods, functions, processes, flows, and procedures, according to an implementation of the present disclosure.

FIG. 3 is a block diagram illustrating an example of a computer system 300 used to provide computational functionalities associated with described algorithms, methods, functions, processes, flows, and procedures, according to an implementation of the present disclosure.

The illustrated computer 302 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 302 can comprise a computer that includes an input device, such as a keypad, keyboard, touch screen, another input device, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a computer system as a client, network component, a server, a database or another persistency, another role, or a combination of roles for performing the subject matter described in the present disclosure. The illustrated computer 302 is communicably coupled with a network 330. In some implementations, one or more components of the computer 302 can be configured to operate within an environment, including cloud-computing-based, local, global, another environment, or a combination of environments.

At a high level, the computer 302 is an electronic computing device operable to receive, transmit, process, store, or manage data and information associated with the described subject matter. According to some implementations, the computer 302 can also include or be communicably coupled with a server, including an application server, e-mail server, web server, caching server, streaming data server, another server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users (for example, from a command console or by another internal access method), external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using this service layer. Software services, such as those provided by the service layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and comprises logic encoded in software, hardware, or a combination of software and hardware. More specifically, the interface 304 can comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data for the computer 302, another component communicatively linked to the network 330 (whether illustrated or not), or a combination of the computer 302 and another component. For example, database 306 can be an in-memory, conventional, or another type of database storing data consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases of similar or differing types can be used according to particular needs, desires, or particular implementations of the computer 302 and the described functionality. While database 306 is illustrated as an integral component of the computer 302, in alternative implementations, database 306 can be external to the computer 302. As illustrated, the database 306 can hold previously described relationship list 316 and previously described account information database 318.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or another power management functionality). In some implementations, the power-supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

Described implementations of the subject matter can include one or more features, alone or in combination.

For example, in a first implementation, a computer-implemented method, comprising: receiving account information input by a user for data transfer; determining identity information associated with the received account information; determining one or more pieces of account information associated with the determined identity information, wherein the one or more pieces of account information are determined based on a predetermined condition, and the one or more pieces of account information include the received account information; providing the one or more pieces of account information to the user; and in response to receiving a user confirmation of the one or more pieces of account information, performing the data transfer based on the user confirmation.

The foregoing and other described implementations can each, optionally, include one or more of the following features:

A first feature, combinable with any of the following features, wherein the predetermined condition includes a degree of similarity with the received account information greater than a predetermined threshold.

A second feature, combinable with any of the previous or following features, wherein the one or more pieces of account information include more than one piece of account information, the user confirmation comprising a user selection of one of the more than one piece of account information.

A third feature, combinable with any of the previous or following features, wherein determining one or more pieces of account information associated with the determined identity information includes at least one of: querying a relationship list for one or more pieces of account information associated with the determined identity information, wherein the relationship list stores a plurality of pieces of identity information, and for each piece of identity information the relationship list stores one or more pieces of account information that satisfy the predetermined condition; and querying an account information database for one or more pieces of account information associated with the determined identity information.

A fourth feature, combinable with any of the previous or following features, wherein the one or more pieces of account information associated with the determined identity information are determined from querying the account information database, the method further comprising storing the determined one or more pieces of account information associated with the determined identity information in the relationship list.

A fifth feature, combinable with any of the previous or following features, further comprising: receiving a user feedback for the data transfer; and in response to receiving the user feedback, storing the determined one or more pieces of account information associated with the determined identity information in the relationship list.

A sixth feature, combinable with any of the previous or following features, wherein providing the one or more pieces of account information to the user includes providing the one or more pieces of account information and corresponding degree of similarity with the received account information to the user.

In a second implementation, a non-transitory, computer-readable medium storing one or more instructions executable by a computer system to perform operations comprising: receiving account information input by a user for data transfer; determining identity information associated with the received account information; determining one or more pieces of account information associated with the determined identity information, wherein the one or more pieces of account information are determined based on a predetermined condition, and the one or more pieces of account information include the received account information; providing the one or more pieces of account information to the user; and in response to receiving a user confirmation of the one or more pieces of account information, performing the data transfer based on the user confirmation.

The foregoing and other described implementations can each, optionally, include one or more of the following features:

A first feature, combinable with any of the following features, wherein the predetermined condition includes a degree of similarity with the received account information greater than a predetermined threshold.

A second feature, combinable with any of the previous or following features, wherein the one or more pieces of account information include more than one piece of account information, the user confirmation comprising a user selection of one of the more than one piece of account information.

A third feature, combinable with any of the previous or following features, wherein determining one or more pieces of account information associated with the determined identity information includes at least one of: querying a relationship list for one or more pieces of account information associated with the determined identity information, wherein the relationship list stores a plurality of pieces of identity information, and for each piece of identity information the relationship list stores one or more pieces of account information that satisfy the predetermined condition; and querying an account information database for one or more pieces of account information associated with the determined identity information.

A fourth feature, combinable with any of the previous or following features, wherein the one or more pieces of account information associated with the determined identity information are determined from querying the account information database, the operations further comprising storing the determined one or more pieces of account information associated with the determined identity information in the relationship list.

A fifth feature, combinable with any of the previous or following features, the operations further comprising: receiving a user feedback for the data transfer; and in response to receiving the user feedback, storing the determined one or more pieces of account information associated with the determined identity information in the relationship list.

A sixth feature, combinable with any of the previous or following features, wherein providing the one or more pieces of account information to the user includes providing the one or more pieces of account information and corresponding degree of similarity with the received account information to the user.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: receiving account information input by a user for data transfer; determining identity information associated with the received account information; determining one or more pieces of account information associated with the determined identity information, wherein the one or more pieces of account information are determined based on a predetermined condition, and the one or more pieces of account information include the received account information; providing the one or more pieces of account information to the user; and in response to receiving a user confirmation of the one or more pieces of account information, performing the data transfer based on the user confirmation.

The foregoing and other described implementations can each, optionally, include one or more of the following features:

A first feature, combinable with any of the following features, wherein the predetermined condition includes a degree of similarity with the received account information greater than a predetermined threshold.

A second feature, combinable with any of the previous or following features, wherein the one or more pieces of account information include more than one piece of account information, the user confirmation comprising a user selection of one of the more than one piece of account information.

A third feature, combinable with any of the previous or following features, wherein determining one or more pieces of account information associated with the determined identity information includes at least one of: querying a relationship list for one or more pieces of account information associated with the determined identity information, wherein the relationship list stores a plurality of pieces of identity information, and for each piece of identity information the relationship list stores one or more pieces of account information that satisfy the predetermined condition; and querying an account information database for one or more pieces of account information associated with the determined identity information.

A fourth feature, combinable with any of the previous or following features, wherein the one or more pieces of account information associated with the determined identity information are determined from querying the account information database, the operations further comprising storing the determined one or more pieces of account information associated with the determined identity information in the relationship list.

A fifth feature, combinable with any of the previous or following features, the operations further comprising: receiving a user feedback for the data transfer; and in response to receiving the user feedback, storing the determined one or more pieces of account information associated with the determined identity information in the relationship list.

A sixth feature, combinable with any of the previous or following features, wherein providing the one or more pieces of account information to the user includes providing the one or more pieces of account information and corresponding degree of similarity with the received account information to the user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving account information input by a user for data transfer;
determining identity information associated with the received account information;
determining one or more pieces of account information associated with the determined identity information, wherein the one or more pieces of account information are determined based on a ratio of a number of elements of the account information associated with the determined identity information being the same as a number of elements of the received account information to a number of elements of the account information associated with the determined identity information not being the same as a number of elements of the received account information, and the one or more pieces of account information include the received account information;
providing the one or more pieces of account information to the user; and
in response to receiving a user confirmation of the one or more pieces of account information, performing the data transfer based on the user confirmation.

2. The method of claim 1, wherein the one or more pieces of account information include more than one piece of account information, the user confirmation comprising a user selection of one of the more than one piece of account information.

3. The method of claim 1, wherein determining one or more pieces of account information associated with the determined identity information includes at least one of:
querying a relationship list for one or more pieces of account information associated with the determined identity information, wherein the relationship list stores a plurality of pieces of identity information, and for each piece of identity information the relationship list stores one or more pieces of account information that satisfy a predetermined threshold associated with the ratio; and
querying an account information database for one or more pieces of account information associated with the determined identity information.

4. The method of claim 3, wherein the one or more pieces of account information associated with the determined identity information are determined from querying the account information database, the method further comprising storing the determined one or more pieces of account information associated with the determined identity information in the relationship list.

5. The method of claim 3, further comprising:
receiving a user feedback for the data transfer; and
in response to receiving the user feedback, storing the determined one or more pieces of account information associated with the determined identity information in the relationship list.

6. The method of claim 1, wherein providing the one or more pieces of account information to the user includes providing the one or more pieces of account information with the received account information to the user.

7. A non-transitory, computer-readable medium storing one or more instructions executable by a computer system to perform operations comprising:
receiving account information input by a user for data transfer;
determining identity information associated with the received account information;
determining one or more pieces of account information associated with the determined identity information, wherein the one or more pieces of account information are determined based on a ratio of a number of elements of the account information associated with the determined identity information being the same as a number of elements of the received account information to a number of elements of the account information associated with the determined identity information not being the same as a number of elements of the received account information, and the one or more pieces of account information include the received account information;
providing the one or more pieces of account information to the user; and
in response to receiving a user confirmation of the one or more pieces of account information, performing the data transfer based on the user confirmation.

8. The non-transitory, computer-readable medium of claim 7, wherein the one or more pieces of account information include more than one piece of account information, the user confirmation comprising a user selection of one of the more than one piece of account information.

9. The non-transitory, computer-readable medium of claim 7, wherein determining one or more pieces of account information associated with the determined identity information includes at least one of:
querying a relationship list for one or more pieces of account information associated with the determined identity information, wherein the relationship list stores a plurality of pieces of identity information, and for each piece of identity information the relationship list stores one or more pieces of account information that satisfy a predetermined threshold associated with the ratio; and
querying an account information database for one or more pieces of account information associated with the determined identity information.

10. The non-transitory, computer-readable medium of claim 9, wherein the one or more pieces of account information associated with the determined identity information are determined from querying the account information database, the operations further comprising storing the determined one or more pieces of account information associated with the determined identity information in the relationship list.

11. The non-transitory, computer-readable medium of claim 9, the operations further comprising:
receiving a user feedback for the data transfer; and
in response to receiving the user feedback, storing the determined one or more pieces of account information associated with the determined identity information in the relationship list.

12. The non-transitory, computer-readable medium of claim 7, wherein providing the one or more pieces of account information to the user includes providing the one or more pieces of account information with the received account information to the user.

13. A computer-implemented system, comprising:
one or more computers; and
one or more computer memory devices interoperably coupled with the one or more computers and having tangible, non-transitory, machine-readable media storing instructions that, when executed by the one or more computers, perform operations comprising:
receiving account information input by a user for data transfer;
determining identity information associated with the received account information;
determining one or more pieces of account information associated with the determined identity information, wherein the one or more pieces of account information are determined based on a ratio of a number of elements of the account information associated with the determined identity information being the same as a number of elements of the received account information to a number of elements of the account information associated with the determined identity information not being the same as a number of elements of the received account information, and the one or more pieces of account information include the received account information;
providing the one or more pieces of account information to the user; and
in response to receiving a user confirmation of the one or more pieces of account information, performing the data transfer based on the user confirmation.

14. The system of claim 13, wherein the one or more pieces of account information include more than one piece of account information, the user confirmation comprising a user selection of one of the more than one piece of account information.

15. The system of claim 13, wherein determining one or more pieces of account information associated with the determined identity information includes at least one of:
querying a relationship list for one or more pieces of account information associated with the determined identity information, wherein the relationship list stores a plurality of pieces of identity information, and for each piece of identity information the relationship list stores one or more pieces of account information that satisfy a predetermined threshold associated with the ratio; and
querying an account information database for one or more pieces of account information associated with the determined identity information.

16. The system of claim 15, wherein the one or more pieces of account information associated with the determined identity information are determined from querying the account information database, the operations further comprising storing the determined one or more pieces of account information associated with the determined identity information in the relationship list.

17. The system of claim 15, the operations further comprising:
receiving a user feedback for the data transfer; and
in response to receiving the user feedback, storing the determined one or more pieces of account information associated with the determined identity information in the relationship list.

* * * * *